(12) United States Patent
Yamada et al.

(10) Patent No.: US 9,430,992 B2
(45) Date of Patent: Aug. 30, 2016

(54) MEMORY ACCESS DEVICE

(75) Inventors: Yasuhiro Yamada, Kanagawa (JP);
Norihiko Nagai, Kanagawa (JP)

(73) Assignee: NTT ELECTRONICS CORPORATION, Yokohama (JP)

( * ) Notice: Subject to any disclaimer, the term of this patent is extended or adjusted under 35 U.S.C. 154(b) by 222 days.

(21) Appl. No.: 13/992,996

(22) PCT Filed: Mar. 10, 2011

(86) PCT No.: PCT/JP2011/055605
§ 371 (c)(1),
(2), (4) Date: Jun. 10, 2013

(87) PCT Pub. No.: WO2012/120674
PCT Pub. Date: Sep. 13, 2012

(65) Prior Publication Data
US 2014/0139536 A1    May 22, 2014

(51) Int. Cl.
*H04N 19/46* (2014.01)
*H04N 19/423* (2014.01)
*G09G 5/39* (2006.01)
*G09G 5/393* (2006.01)
*H04N 19/523* (2014.01)
*G06F 13/32* (2006.01)
*G06F 13/28* (2006.01)
*G06F 12/08* (2016.01)
*G06T 1/60* (2006.01)
*G06F 13/16* (2006.01)

(52) U.S. Cl.
CPC ............... *G09G 5/393* (2013.01); *G06F 13/28* (2013.01); *G06T 1/60* (2013.01); *H04N 19/423* (2014.11); *H04N 19/46* (2014.11); *H04N 19/523* (2014.11); *G06F 13/16* (2013.01)

(58) Field of Classification Search
CPC .......... G09G 5/39; G09G 5/393; G06F 13/32; G06F 12/0879; G06F 13/28
See application file for complete search history.

(56) References Cited

U.S. PATENT DOCUMENTS

2009/0013056 A1*  1/2009  Weinstock et al. ............ 709/208
2009/0238478 A1   9/2009  Banno
2011/0075942 A1*  3/2011  Deaver .......................... 382/232

FOREIGN PATENT DOCUMENTS

| JP | 2008-176765 A | 7/2008 |
| JP | 2009-223758 A | 10/2009 |
| JP | 2010-183401 A | 8/2010 |

* cited by examiner

*Primary Examiner* — Matthew Salvucci
(74) *Attorney, Agent, or Firm* — Arent Fox LLP

(57) ABSTRACT

A first look-up table (10) outputs a result of dividing a horizontal component of a pixel address in the block by number of pixels in a horizontal component of the cell. A second look-up table (12) outputs a result of dividing a vertical component of a pixel address in the block by number of pixels in a vertical component of the cell. A third look-up table (14) outputs a residue as a result of dividing a horizontal component of a pixel address in the block by number of pixels in a horizontal component of the cell. A fourth look-up table (16) outputs a residue as a result of dividing a vertical component of a pixel address in the block by number of pixels in a vertical component of the cell. The output values of the first and second look-up tables (10,12) are addresses of the cell for burst access to the memory. The output values of the third and fourth look-up tables (14,16) are used as pixel addresses in the cell.

3 Claims, 16 Drawing Sheets

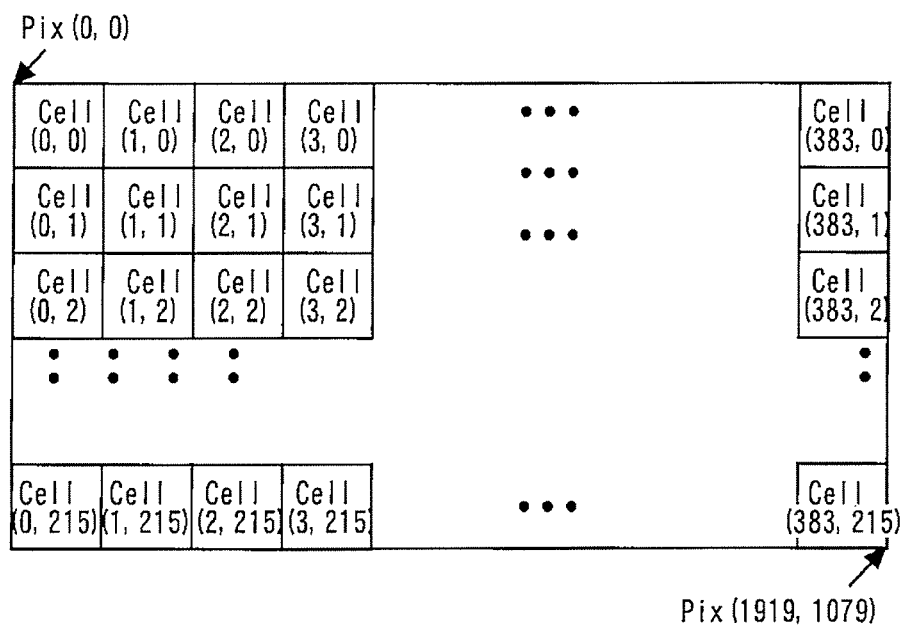

FIG. 3

| CELL | SDRAM |
|------|-------|
| XD0  | BA0   |
| XD1  | BA1   |
| XD2  | CA3   |
| XD3  | CA4   |
| XD4  | CA5   |
| XD5  | CA6   |
| XD6  | CA7   |
| XD7  | CA8   |
| XD8  | CA9   |

| CELL | SDRAM |
|------|-------|
| YD0  | BA2   |
| YD1  | RA0   |
| YD2  | RA1   |
| YD3  | RA2   |
| YD4  | RA3   |
| YD5  | RA4   |
| YD6  | RA5   |
| YD7  | RA6   |

FIG. 25

| CELL | SDRAM |
|------|-------|
| XC0  | BA0   |
| XC1  | BA1   |
| XC2  | CA3   |
| XC3  | CA4   |
| XC4  | CA5   |
| XC5  | CA6   |
| XC6  | CA7   |
| XC7  | CA8   |
|      |       |

| CELL | SDRAM |
|------|-------|
| YC0  | BA2   |
| YC1  | RA0   |
| YC2  | RA1   |
| YC3  | RA2   |
| YC4  | RA3   |
| YC5  | RA4   |
| YC6  | RA5   |
| YC7  | RA6   |
| YC8  | RA7   |

FIG. 26

Pix (0, 0)

| Cell (0, 0) | Cell (1, 0) | Cell (2, 0) | Cell (3, 0) | ... | Cell (479, 0) |
| Cell (0, 1) | Cell (1, 1) | Cell (2, 1) | Cell (3, 1) | ... | Cell (479, 1) |
| Cell (0, 2) | Cell (1, 2) | Cell (2, 2) | Cell (3, 2) | ... | Cell (479, 2) |
| ... | ... | ... | ... | | ... |
| Cell (0, 269) | Cell (1, 269) | Cell (2, 269) | Cell (3, 269) | ... | Cell (479, 269) |

Pix (1919, 1079)

FIG. 27

| PixC (0, 0) | PixC (1, 0) | PixC (2, 0) | PixC (3, 0) |
|---|---|---|---|
| PixC (0, 1) | PixC (1, 1) | PixC (2, 1) | PixC (3, 1) |
| PixC (0, 2) | PixC (1, 2) | PixC (2, 2) | PixC (3, 2) |
| PixC (0, 3) | PixC (1, 3) | PixC (2, 3) | PixC (3, 3) |

FIG. 28

| CELL | SDRAM |
|---|---|
| XC0 | BA0 |
| XC1 | BA1 |
| XC2 | CA3 |
| XC3 | CA4 |
| XC4 | CA5 |
| XC5 | CA6 |
| XC6 | CA7 |
| XC7 | CA8 |
| XC8 | CA9 |

| CELL | SDRAM |
|---|---|
| YC0 | BA2 |
| YC1 | RA0 |
| YC2 | RA1 |
| YC3 | RA2 |
| YC4 | RA3 |
| YC5 | RA4 |
| YC6 | RA5 |
| YC7 | RA6 |
| YC8 | RA7 |

MEMORY ACCESS DEVICE

CROSS-REFERENCE TO RELATED APPLICATIONS

This application is a National Stage entry of International Application No. PCT/JP2011/055605, filed Mar. 10, 2011. The disclosure of the prior application is hereby incorporated in its entirety by reference.

TECHNICAL FIELD

The present invention relates to a memory access device which can enhance the memory utilization ratio and memory access efficiency even when the number of bits per pixel is not a power of 2.

BACKGROUND ART

A memory access device is provided in an image processing apparatus. When the image processing apparatus performs image processing, the memory access device reads data from a SDRAM (Synchronous Dynamic Random Access Memory) in which image frames are stored. In the case of accessing to image data of the SDRAM in the image processing apparatus, a rectangular area is generally accessed. The rectangular area is set with starting point coordinates and end point coordinates, or set with starting point coordinates and the size (number of pixels) of the rectangular area in a horizontal direction and a vertical direction.

A description is hereinafter given of a conventional method for accessing to the SDRAM by the memory access device. Conventionally, 8 bits/pixel image processing was mainly performed. If burst access to the SDRAM is performed on the basis of 8 words/burst, and two SDRAMs with 16 bits/word are used at the time of the image processing, the number of pixels accessed in one burst access is 32 pixels according to the following calculation.

16 bits/word×8 words/burst×2 SDRAMs=256 bits/burst 256 bits/burst divided by 8 bits/pixel=32 pixels/burst A rectangular area accessed in this one burst is defined as a cell. In this case, the cell is a rectangular area having 32 pixels. One example of the 32-pixel cell is a cell of 8×4 pixels (8 horizontal pixels×4 vertical pixels).

When the 8×4-pixel cell is used, 240 horizontal cells and 270 vertical cells are mapped on an image frame of 1920× 1080 pixels for a general HD (High Definition) image.

When a pixel address of an HD image is defined as Pix(x, y), "x" is in the range of 0 to 1919 while "y" is in the range of 0 to 1079, and the respective variables can be expressed with 11 bits each. When the address of the cells assigned to an HD image is defined as Cell(x, y), "x" is in the range of 0 to 239 while "y" is in the range of 0 to 269, and "x" can be expressed with 8 bits while "y" can be expressed with 9 bits. FIG. 23 is a view showing the pixel address and the cell address in an HD image in the background art in the case of 8 bits/pixel.

In an address PixC(x, y) of pixels in each cell, x=0 to 7, y=0 to 3, and "x" can be expressed with 3 bits while "y" can be expressed with 2 bits. FIG. 24 is a view showing the pixel address in each cell in the background art in the case of 8 bits/pixel.

Variables "x" and "y" in Pix(x, y) are expressed as binary numbers in order from LSB (Least Significant Bit) to MSB (Most Significant Bit) as shown below:

$x = (X0, X1, \ldots, X10)$ $y = (Y0, Y1, \ldots, Y10)$

Variables "x" and "y" in Cell(x, y) are similarly expressed as shown below:

$x = (XC0, XC1, \ldots, XC7)$ $y = (YC0, YC1, \ldots, YC8)$

Variables "x" and "y" in PixC(x, y) are similarly expressed as shown below:

$x = (XP0, XP1, XP2)$ $y = (YP0, YP1)$

Variables "x" and "y" in Pix(x, y) are expressed by Cell(x, y) and PixC(x, y) as shown below:

$$x = (X0, X1, \ldots, X10)$$
$$= (XP0, XP1, XP2, XC0, XC1, \ldots, XC7)$$

$$y = (Y0, Y1, \ldots, Y10)$$
$$= (YP0, YP1, YC0, YC1, \ldots, YC8)$$

For example, variables "x" and "y" in Pix(15, 9) are expressed as binary numbers in order from LSB to MSB as shown below:

$x = (1,1,1,1,0,0,0,0,0,0,0)$ $y = (1,0,0,1,0,0,0,0,0,0,0)$

When these values are applied to the above-stated formula, the followings are obtained:

$(XP0, XP1, XP2) = (1,1,1)$ $(XC0, XC1, XC7) = (1,0,0,0,0,0,0,0)$ $(YP0, YP1) = (1,0)$ $(YC0, YC1, YC8) = (0,1,0,0,0,0,0,0,0)$

Therefore, Cell(x, y) and PixC(x, y) are as shown below:

$Cell(x,y) = Cell(1,2)$ $PixC(x,y) = PixC(7,1)$

The number of horizontal pixels and the number of vertical pixels in one cell are powers of 2. Accordingly, in the case of 8 bits/pixel image processing, hence a cell address Cell(x, y) of the SDRAM can be obtained only with upper bits (a part of bits taken out in order from the MSB) of the pixel address Pix(x, y). Therefore, access control of the SDRAM can easily be performed.

When adjacent cells have an identical bank address and their row address is changed during continuous burst access, it is necessary to temporarily stop the access to change the row address. Accordingly, continuous burst access is interrupted and additional time is needed for changing the row address. On the contrary, when adjacent cells have different bank addresses, cells in one bank can be accessed while the row address in other bank is set up, so that continuous burst access can be implemented. Therefore, in order to perform continuous burst access to rectangular areas in the SDRAM, it is necessary to so set that adjacent cells have different bank addresses in both the horizontal direction and the vertical direction.

In the case of an SDRAM with 16-bit width and 1-Gbit DDR3 (Double-Data-Rate3), a column address CA, a row address RA, and a bank address BA are as shown below:

$$CA=(CA0, CA1, \ldots, CA9)$$

$$RA=(RA0, RA1, \ldots, RA12)$$

$$BA=(BA0, BA1, BA2)$$

Of these, lower 3-bit column addresses CA0 to CA2 are 8-word identification addresses for burst access, and therefore in the burst access, they are meaningless (set to 000), and are not used in address allocation. Accordingly, by allocating 23 bits except CA0 to CA2 as the cell address as shown in FIG. 25, continuous burst access can be performed. FIG. 25 is a view showing allocation of the SDRAM address to the cell address in the background art in the case of 8 bits/pixel.

In FIG. 25, the bank address of 2 bits is allocated to lower 2 bits XC cell address, and the bank address of 1 bit is allocated to a lower 1 bit YC cell address. In this allocation, continuous burst access to rectangular areas is performed in such a way that the cells in the horizontal direction are first subjected to continuous burst access, and then the direction of the cells are changed to the vertical direction so that the vertical cells are subjected to continuous access. When the cells in the vertical direction are first subjected to continuous burst access, the bank address of 1 bit is allocated to the LSB of XC addresses, and the bank address of 2 bits is allocated to lower 2 bit YC addresses.

Variables "x" and "y" in Pix(x, y) are expressed with a pixel address in a cell, a bank address, a column address, and a row address as shown below:

$$x = (X0, X1, \ldots, X10)$$
$$= (XP0, XP1, XP2, XC0, XC1, \ldots, XC7)$$
$$= (XP0, XP1, XP2, BA0, BA1, CA3, CA4, \ldots, CA8)$$

$$y = (Y0, Y1, \ldots, Y10)$$
$$= (YP0, YP1, YC0, YC1, \ldots, YC8)$$
$$= (YP0, YP1, BA2, RA0, RA1, \ldots, RA7)$$

When data of a part of an image frame, that is, a rectangular area (block) of 16×16 pixels or 8×8 pixels, is read from a memory in order to perform image processing on the area, using the above access method makes it possible to easily obtain which cell to access using the upper bits of the pixel address. Moreover, address allocation of the bank address, the column address, and the row address with use of the cell address allows for implementation of continuous burst access.

In recent years, there are growing needs for 10 bits/pixel image processing that is higher in quality than conventional 8 bits/pixel image processing. Furthermore, 12 bits/pixel image processing is also being studied. For example, a technology has been proposed in which 10 bits/pixel data is compressed to 8 bits/pixel data and stored in a memory, and at the time of image processing, the compressed data is expanded to 10 bits/pixel data (see, for example, Patent Literature 1). With use of this technology, pixel data whose number of bits per pixel is not equal to a power of 2, such as 10 bits/pixel data, can be processed with apparatuses similar to those for 8 bits/pixel image processing.

CITATION LIST

Patent Literature

Patent Literature 1: Japanese Patent Laid-Open No. 2010-183401

SUMMARY OF INVENTION

Technical Problem

However, when 10 bits/pixel data is compressed to 8 bits/pixel data and image-processed as shown in Patent Literature 1, images are deteriorated. In order to prevent image deterioration, memory access to the original 10 bits/pixel data is needed. At that time, by making the number of horizontal pixels and the number of vertical pixels in a cell to be powers of 2, access control can easily be implemented as in the case of 8 bits/pixel data.

However, if the number of horizontal pixels and the number of vertical pixels in one cell are made to be powers of 2 in the case of 10 bits/pixel image processing, a utilization ratio and access efficiency of the SDRAM is degraded. The reason thereof will be described below.

If burst access is performed on the basis of 8 words/burst, and two SDRAMs with 16 bits/word are used, the size of data accessed in one burst is 256 bits according to the following calculation.

16 bits/word×8 words/burst×2 SDRAMs=256 bits/burst

If only 160 bits, out of 256 bits accessed in one burst, are used, a cell contains sixteen 10-bit pixels, i.e., a cell of 16 pixels is formed. Therefore, it becomes possible to make the number of horizontal pixels and the number of vertical pixels in one cell to be powers of 2 (4 horizontal pixels×4 vertical pixels). When an image frame for a general HD image is configured by 4×4 pixels, 480 horizontal cells and 270 vertical cells are allocated.

When the pixel address of an HD image is defined as Pix(x, y), "x" is in the range of 0 to 1919 while "y" is in the range of 0 to 1079, and the respective variables can be expressed with 11 bits each. When the address of the cells assigned to an HD image is defined as Cell(x, y), "x" is in the range of 0 to 479 while "y" is in the range of 0 to 269, and the respective variables can be expressed with 9 bits each. FIG. 26 is a view showing the pixel address and the cell address in an HD image in the background art in the case of 10 bits/pixel.

In the address PixC(x, y) of pixels in each cell, x=0 to 3, y=0 to 3, and the respective variables can be expressed with 2 bits each. FIG. 27 is a view showing the pixel address in each cell in the background art in the case of 10 bits/pixel.

Variables "x" and "y" in Pix(x, y) are expressed as binary numbers in order from LSB to MSB as shown below:

$$x=(X0, X1, \ldots, X10)$$

$$y=(Y0, Y1, \ldots, Y10)$$

Variables "x" and "y" in Cell(x, y) are similarly expressed as shown below:

$$x=(XC0, XC1, \ldots, XC8)$$

$$y=(YC0, YC1, \ldots, YC8)$$

Variables "x" and "y" in PixC(x, y) are similarly expressed as shown below:

$$x=(XP0, XP1)$$

$$y=(YP0, YP1)$$

Variables "x" and "y" in Pix(x, y) are expressed with the cell address Cell(x, y) and the pixel address PixC(x, y) in a cell as shown below:

$$x = (X0, X1, \ldots, X10)$$
$$= (XP0, XP1, XC0, XC1, \ldots, XC8)$$
$$y = (Y0, Y1, \ldots, Y10)$$
$$= (YP0, YP1, YC0, YC1, \ldots, YC8)$$

For example, variables "x" and "y" in Pix (15, 9) are expressed as binary numbers in order from LSB to MSB as shown below:

$$x=(1,1,1,1,0,0,0,0,0,0,0)$$

$$y=(1,0,0,1,0,0,0,0,0,0,0)$$

When these values are applied to the above-stated formula, the followings are obtained:

$$(XP0,XP1)=(1,1)$$

$$(XC0,XC1,\ldots,XC8)=(1,1,0,0,0,0,0,0,0)$$

$$(YP0,YP1)=(1,0)$$

$$(YC0,YC1,\ldots,YC8)=(0,1,0,0,0,0,0,0,0)$$

Therefore, Cell(x, y) and PixC(x, y) are as shown below:

$$\text{Cell}(x,y)=\text{Cell}(3,2)$$

$$\text{Pix}C(x,y)=\text{Pix}C(3,1)$$

Thus, even in the case of 10 bits/pixel, making the number of horizontal pixels and the number of vertical pixels in one cell to be powers of 2 makes it possible to obtain the SDRAM cell address from only the upper bits of the pixel address. Therefore, access control of the SDRAM can easily be performed.

FIG. 28 is also a view showing allocation of the SDRAM address to the cell address in the background art in the case of 10 bits/pixel. Continuous burst access can be performed by allocating the cell address to the bank address, the column address, and the row address as shown in FIG. 28. More specifically, variables "x" and "y" in Pix(x, y) are expressed with the pixel address in a cell, the bank address, the column address, and the row address as shown below:

$$x = (X0, X1, \ldots, X10)$$
$$= (XP0, XP1, XC0, XC1, \ldots, XC8)$$
$$= (XP0, XP1, BA0, BA1, CA3, CA4, \ldots, CA9)$$
$$y = (Y0, Y1, \ldots, Y10)$$
$$= (YP0, YP1, YC0, YC1, \ldots, YC8)$$
$$= (YP0, YP1, BA2, RA0, RA1, \ldots, RA7)$$

As described in the foregoing, when data of a part of an image frame, that is, a rectangular area (block) of 16×16 pixels or 8×8 pixels, is read from a memory in order to perform image processing of that area, it is possible to easily obtain which cell to access. Moreover, address allocation of the bank address, the column address, and the row address is performed with use of the cell address, so that continuous burst access can be implemented.

Here, in the case of 8 bits/pixel, 256 bits accessed in one burst are all used. On the contrary, in the case of 10 bits/pixel, only 160 bits out of 256 bits accessed in one burst are used, and unused 96 bits are discarded. A utilization ratio of the SDRAM in this case is 256/256=100% in 8 bits/pixel whereas the ratio is 160/256=62.5% in 10 bits/pixel.

The access efficiency is also deteriorated in a similar manner. Since 1 word corresponds to 16 bits, 256 bits in the case of 8 bits/pixel corresponds to 256/16=16 words. Generally, high-speed data exchange requires multiples of 8 words, and therefore, fast access can be achieved in the case of 8 bits/pixel. On the contrary, in the case of 10 bits/pixel, the number of words necessary for 160 bits to be used is 160/16=10 words. Therefore, 10-words access requires 16-words access, which is a multiple of 8. The access efficiency in this case is 16 words/16 words=100% in 8 bits/pixel whereas the efficiency is 10 words/16 words=62.5% in 10 bits/pixel.

The number of cells in one image frame for HD images is 240×270=64,800 in 8 bits/pixel whereas the number thereof is 480×270=129,600 in 10 bit/pixel. Therefore, the frequency of access to the SDRAM is two times larger in the case of 10 bits/pixel.

As described in the foregoing, when the number of bits per pixel is not a power of 2 as in the case of 10 bits/pixel, problems of low memory utilization ratio and low memory access efficiency were present in the background art.

In view of the above-described problems, an object of the present invention is to provide a memory access device which can enhance the memory utilization ratio and memory access efficiency even when the number of bits per pixel is not a power of 2.

Means for Solving the Problems

A memory access device calculates number of pixels in one burst access by dividing number of bits obtained in one burst access to a memory storing an image frame by number of bits per pixel and discarding fraction thereof, arranges a rectangular area having number of pixels equal to or less than the calculated number of pixels in the image frame as a cell, accesses to the memory by using the cell, and reads a block of a part of the image frame. The memory access device comprises: a first look-up table outputting a result of dividing a horizontal component of a pixel address in the block by number of pixels in a horizontal component of the cell; a second look-up table outputting a result of dividing a vertical component of a pixel address in the block by number of pixels in a vertical component of the cell; a third look-up table outputting a residue as a result of dividing a horizontal component of a pixel address in the block by number of pixels in a horizontal component of the cell; and a fourth look-up table outputting a residue as a result of dividing a vertical component of a pixel address in the block by number of pixels in a vertical component of the cell. The output value of the first look-up table and the output value of the second look-up table are addresses of the cell for burst access to the memory. The output value of the third look-up table and the output value of the fourth look-up table are used as pixel addresses in the cell.

Effect of Invention

The invention can enhance the memory utilization ratio and memory access efficiency even when the number of bits per pixel is not a power of 2.

BRIEF DESCRIPTION OF THE DRAWINGS

FIG. 1 is a view showing the pixel address and the cell address in a HD image in the embodiment of the present invention.

FIG. 2 is a view showing the pixel address in each cell in the embodiment of the present invention.

FIG. 3 is a view showing allocation of the SDRAM address with respect to the cell address in the embodiment of the present invention.

FIG. 25 is a view showing allocation of the SDRAM address to the cell address in the background art in the case of 8 bits/pixel.

FIG. 26 is a view showing the pixel address and the cell address in an HD image in the background art in the case of 10 bits/pixel.

FIG. 27 is a view showing the pixel address in each cell in the background art in the case of 10 bits/pixel.

FIG. 28 is also a view showing allocation of the SDRAM address to the cell address in the background art in the case of 10 bits/pixel.

Figure 4:
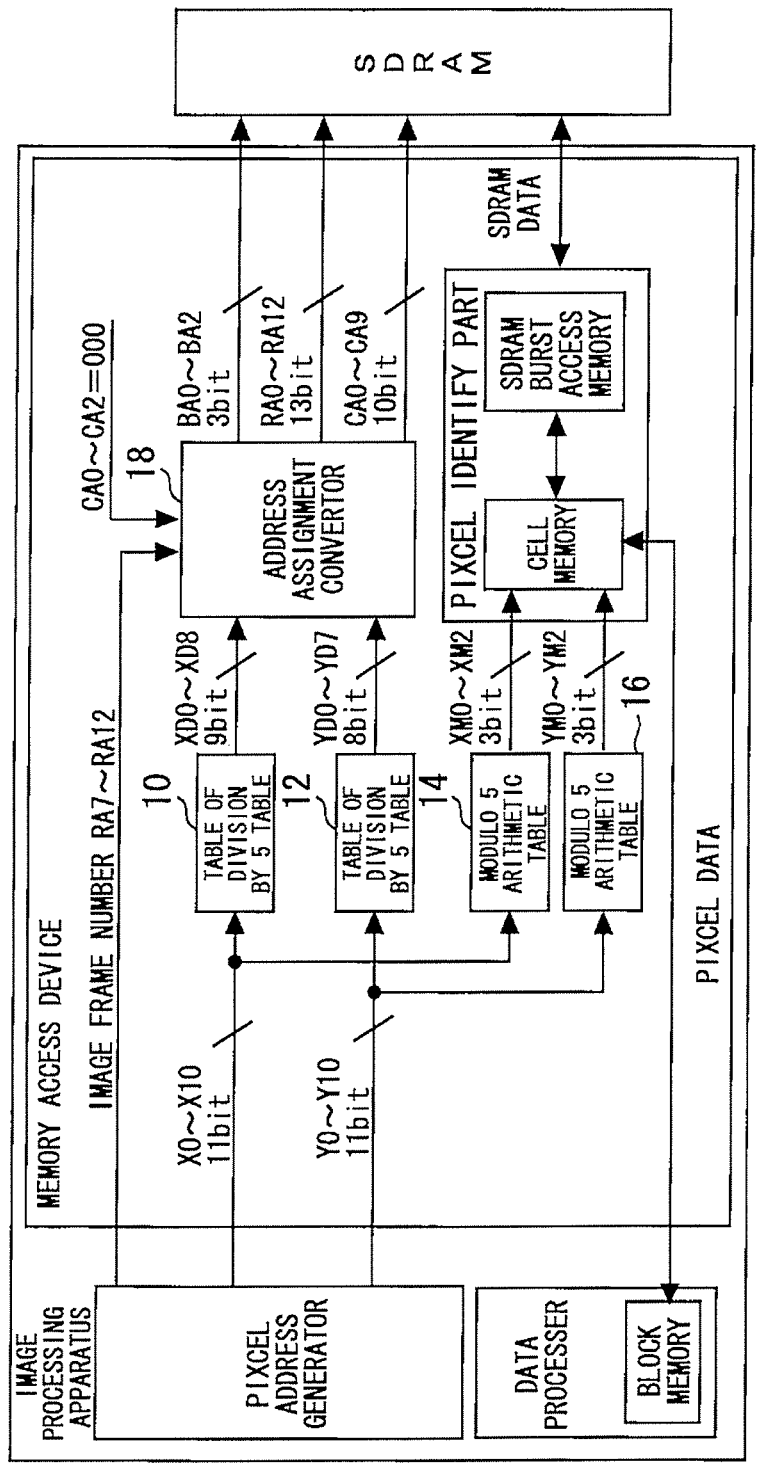
FIG. 4 is a view showing a memory access device according to the embodiment of the present invention.

DESCRIPTION OF SYMBOLS 10 look-up table (first look-up table)
12 look-up table (second look-up table)
14 look-up table (third look-up table)
16 look-up table (fourth look-up table)

DESCRIPTION OF EMBODIMENTS

In a memory access device according to an embodiment of the present invention, image data accessed in one burst is subjected to maximum access regardless of the number of pixels in a cell being a power of 2 or not. In one example, 256 bits/burst divided by 10 bits/pixel=25 pixels/burst in the case of 10 bits/pixel. Therefore, the number of pixels per burst access is 25 pixels. A rectangular area having these 25 pixels is defined as a cell. One example of the 25-pixel cell is a cell of 5×5 pixels (5 horizontal pixels×5 vertical pixels). In an image frame for general HD images, 384 horizontal cells and 216 vertical cells are allocated. The memory access device uses these cells to access to the SDRAM and reads out data.

Variables "x" and "y" in the pixel address Pix(x, y) of an HD image are in the range of x=0 to 1919 and y=0 to 1079, and the respective variables can be expressed with 11 bits each. Variables "x" and "y" in the address Cell(x, y) of the cells assigned in an HD image are in the range of x=0 to 383 and y=0 to 215, and "x" can be expressed with 9 bits while "y" can be expressed with 8 bits. FIG. 1 is a view showing the pixel address and the cell address in a HD image in the embodiment of the present invention.

Variables "x" and "y" in the address PixC(x, y) of pixels in each cell take values of x=0 to 4 and y=0 to 4, and the respective variables can be expressed with 3 bits each. FIG. 2 is a view showing the pixel address in each cell in the embodiment of the present invention.

Variables "x" and "y" in Pix(x, y) are expressed as binary numbers in order from LSB to MSB as shown below:

$$x = (X0, X1, \ldots, X10)$$

$$y = (Y0, Y1, \ldots, Y10)$$

Variables "x" and "y" in Cell(x, y) are similarly expressed as shown below:

$$x = (XC0, XC1, \ldots, XC8)$$

$$y = (YC0, YC1, \ldots, YC7)$$

Variables "x" and "y" in PixC(x, y) are similarly expressed as shown below:

$$x = (XP0, XP1, XP2)$$

$$y = (YP0, YP1, YP2)$$

For access to the SDRAM, it is necessary to convert variables "x" and "y" in the pixel address Pix(x, y) into the cell address and the pixel address in a cell expressed as binary numbers. However, since the number of horizontal pixels and the number of vertical pixels in one cell are not powers of 2, they cannot easily be obtained from the upper bits in the pixel address. Accordingly, variables "x" and "y" in Cell(x, y) are calculated by the following formulas:

$$x = (XC0, XC1, \ldots, XC8)$$
$$= (X0, X1, \ldots, X10)/5$$

$$y = (YC0, YC1, \ldots, YC7)$$
$$= (Y0, Y1, \ldots, Y10)/5,$$

where the slash (/) represents division and discarding of a fraction. In the present embodiment, a numeric value is divided by 5 and a fraction thereof is discarded. In an HD image, Pix(x, y) is set to have x=0 to 1919 and y=0 to 1079, and therefore, Cell(x, y) is set to have x=0 to 383 and y=0 to 215, so that "x" corresponds to 9 bits and "y" corresponds to 8 bits.

Variables "x" and "y" in this Cell(x, y) are expressed as binary numbers as shown below:

$$x = (X0, X1, \ldots, X10)/5$$
$$= (XD0, XD1, \ldots, XD8)$$
$$y = (Y0, Y1, \ldots, Y10)/5$$
$$= (YD0, YD1, \ldots, YD7)$$

Variables "x" and "y" in PixC(x, y) are similarly expressed as shown below:

$$x = (XP0, XP1, XP2)$$
$$= \text{Modulo}\{(X0, X1, \ldots, X10), 5\}$$
$$y = (YP0, YP1, YP2)$$
$$= \text{Modulo}\{(Y0, Y1, \ldots, Y10), 5\},$$

where "Modulo" represents a residue of division result. In the present embodiment, it represents a residue when a numeric value is divided by 5. When the value is divided by 5, a residue of 0 to 4 is obtained, and therefore, it is expressed with 3 bits.

Variables "x" and "y" in this PixC(x, y) are expressed as binary numbers as follows. These values are used for pixel-based access.

$$x = \text{Modulo}\{(X0, X1, \ldots, X10), 5\}$$
$$= (XM0, XM1, XM2)$$
$$y = \text{Modulo}\{(Y0, Y1, \ldots, Y10), 5\}$$
$$= (YM0, YM1, YM2)$$

Based on the foregoing, variables "x" and "y" in the pixel address Pix(x, y) are expressed using the cell address and the pixel address in a cell as shown below:

$$x = (X0, X1, \ldots, X10)$$
$$= [\text{Modulo}\{(X0, X1, \ldots, X10), 5\}, (X0, X1, \ldots, X10)/5]$$
$$= (XM0, XM1, XM2, XD0, XD1, \ldots, XD8)$$
$$y = (Y0, Y1, \ldots, Y10)$$
$$= [\text{Modulo}\{(Y0, Y1, \ldots, Y10), 5\}, (Y0, Y1, \ldots, Y10)/5]$$
$$= (YM0, YM1, YM2, YD0, YD1, \ldots, YD7)$$

FIG. 3 is a view showing allocation of the SDRAM address with respect to the cell address in the embodiment of the present invention. As shown in FIG. 3, continuous burst access can be performed by allocating (XD0, XD1, . . . , XD8) and (YD0, YD1, . . . , YD7) to the bank address, the column address, and the row address.

FIG. 4 is a view showing a memory access device according to the embodiment of the present invention. The memory access device has look-up tables 10, 12, 14 and 16, and an address assignment conversion circuit 18. The memory access device is provided in the image processing apparatus. When the image processing apparatus performs image processing of a block of a part of an image frame, the memory access device uses the above-stated access method to read out block data from the SDRAM.

More specifically, a cell address for one burst access is obtained in the look-up tables 10 and 12, and a burst access to the SDRAM is conducted. An SDRAM burst access memory temporarily stores data of one burst access corresponding to one cell in the SDRAM, and transfers the data to an adjacent cell memory. The pixel address in the burst-accessed cell are obtained in the look-up tables 14 and 16, a target pixel address for image processing is identified with the cell address and the pixel address in the cell, and pixel data on a target block area is transferred from the cell memory to the image processing apparatus.

The look-up table 10 outputs a result (XD0 to XD8) of dividing a horizontal component (X0 to X10) of the pixel address in the block by the number of pixels (5) in the horizontal component of the cell. The look-up table 12 outputs a result (YD0 to YD7) of dividing a vertical component (Y0 to Y10) of the pixel address in the block by the number of pixels (5) in the vertical component of the cell. The address assignment conversion circuit 18 alarranges the output values of the look-up tables 10 and 12 to the bank address, the column address, and the row address.

The look-up table 14 outputs a residue (XM0 to XM2) as a result of dividing a horizontal component (X0 to X10) of the pixel address in the block by the number of pixels (5) in the horizontal component of the cell. The look-up table 16 outputs a residue (YM0 to YM2) as a result of dividing a vertical component (Y0 to Y10) of the pixel address in the block by the number of pixels (5) in the vertical component of the cell. Output values of the look-up tables 14 and 16 are used as the pixel address in a cell.

The memory access device uses the output values of the look-up tables 10 and 12 as the cell address and allocates the cell address to the SDRAM burst access address with the address assignment conversion circuit 18 so as to access to the SDRAM. Further, the output values of the look-up tables 14 and 16 are used as the pixel address in the burst-accessed cell so as to access to the pixels in the cell.

Figure 5:
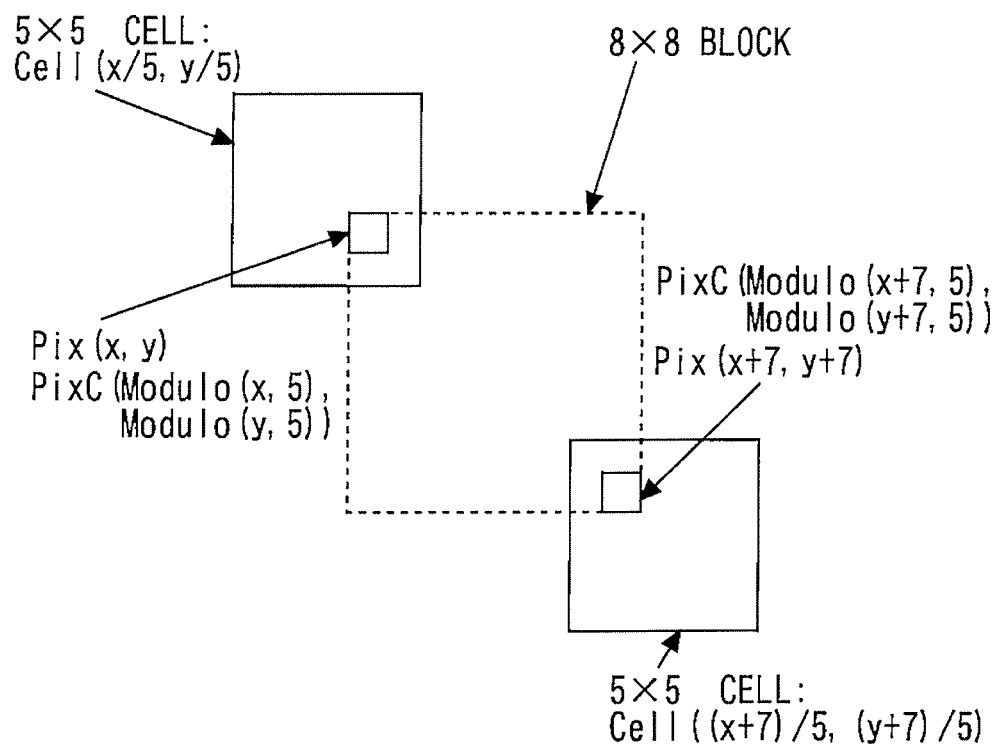
FIG. 5 is a view for explaining read operation from the SDRAM by the memory access device according to the embodiment of the present invention.

FIG. 5 is a view for explaining read operation from the SDRAM by the memory access device according to the embodiment of the present invention. Here, a rectangular area that is an 8×8 pixel block is accessed, for example. Assuming that an upper left pixel coordinates of the rectangular area is set to Pix(x, y), lower right pixel coordinates are set to Pix (x+7, y+7). Therefore, pixels in the area having Pix(x, y) as the upper left starting point coordinates and Pix (x+7, y+7) as the lower right end point coordinates are read from the SDRAM.

In this case, the cell address at the starting point coordinates Pix(x, y) is Cell(x/5, y/5), and the pixel address in the cell is PixC(Modulo(x, 5), Modulo(y, 5)). The cell address at the end point coordinates Pix(x+7, y+7) is set to Cell((x+7)/5, (y+7)/5), and the pixel address in the cell is set to PixC(Modulo(x+7, 5), Modulo(y+7, 5)).

Therefore, the block (8×8 pixel rectangular area) to be accessed is an area having a cell address Cell(x/5, y/5) and a pixel address in the cell PixC(Modulo(x, 5), Modulo(y, 5)) at the starting point coordinates Pix(x, y) and having a cell address Cell((x+7)/5, (y+7)/5) and a pixel address in the cell PixC(Modulo(x+7, 5), Modulo(y+7, 5)) at the end point coordinates. A burst access to the SDRAM is performed in the range of Cell(x/5, y/5) to Cell((x+7)/5, (y+7)/5). An actual access target pixel area is a pixel area from Cell(x/5, y/5) and PixC(Modulo(x, 5), Modulo(y, 5)) to Cell((x+7)/5, (y+7)/5) and PixC(Modulo(x+7, 5), Modulo(y+7, 5)).

In these accesses, the cell address is obtained in the look-up tables 10 and 12, and the pixel address in the cell is obtained in the look-up tables 14 and 16. That is, the memory access device obtains, in the division look-up tables 10 and 12, a cell address corresponding to the starting point coordinates and a cell address corresponding to the end point coordinates, and sequentially accesses to the cells from the starting point cell to the end point cell.

Figure 6:
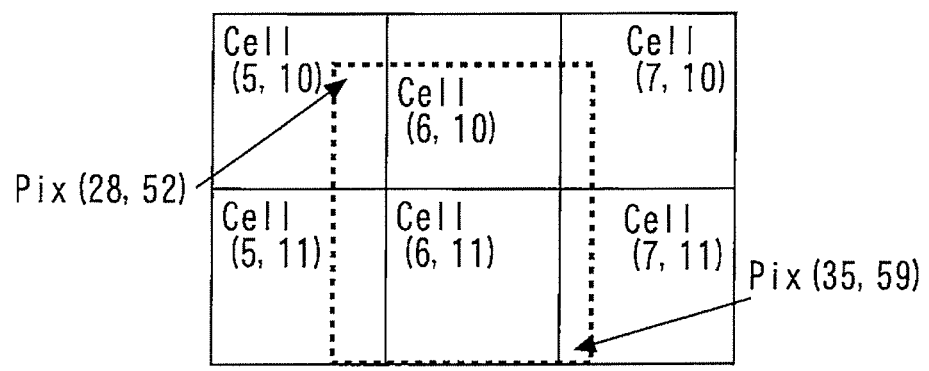
FIG. 6 is a view showing one example of a block to be accessed.

FIG. 6 is a view showing one example of a block to be accessed. When the starting point coordinates are (28, 52), and the end point coordinates are (35, 59), the starting point cell address becomes (5, 10) and the end point cell address becomes (7, 11). Each cell is accessed in order of (5, 10), (6, 10), (7, 10), (5, 11), (6, 11), (7, 11). Alternatively, each cell is accessed in order of (5, 10), (5, 11), (6, 10), (6, 11), (7, 10), (7, 11).

The pixel data in a burst-accessed cell having a cell address Cell(x, y) (pixel data of burst-accessed 25 pixels) is transferred to the cell memory via the burst access memory of the SDRAM that stores image data of one burst access. Then, the data is combined with the pixel address in the cell PixC(x, y) in the cell memory so as to specify a pixel address Pix(x, y) that is a target of image processing. The pixel data at the pixel address Pix(x, y) is transferred to a block memory in a data processing section.

Figure 7:
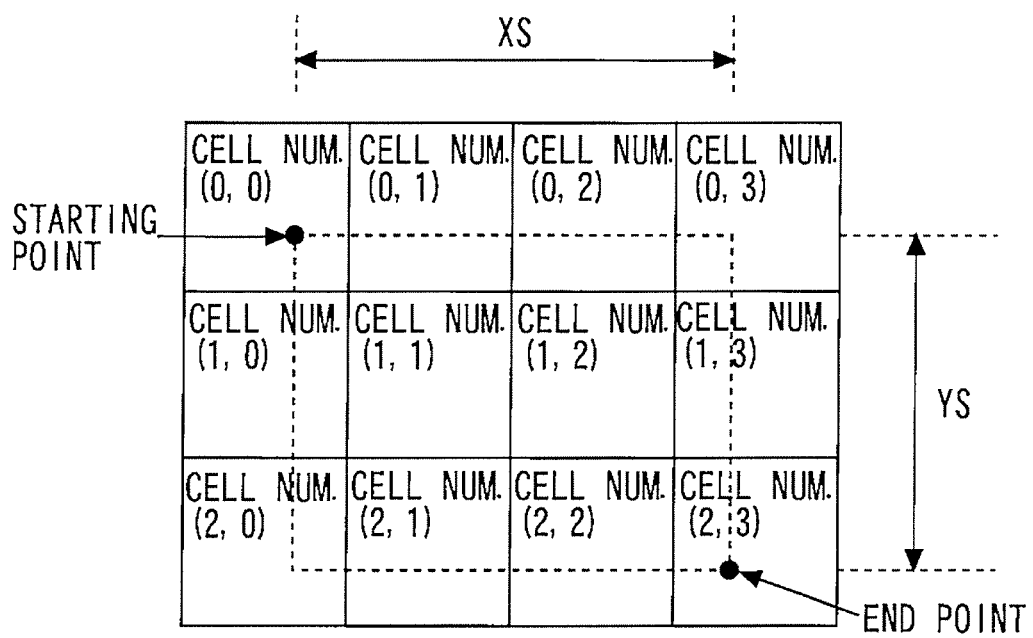
FIG. 7 is a view showing one example of a rectangular area made up of a plurality of cells read-accessed from the SDRAM.

FIG. 7 is a view showing one example of a rectangular area made up of a plurality of cells read-accessed from the SDRAM. Here, the rectangular areas are made up of 4×3 cells. From image data of this rectangular area, an area necessary to process with the image processing apparatus is cropped and used. The image data of the rectangular area is temporarily stored in sequence in the cell base in the cell memory included in the memory access device. For example, as shown in FIG. 7, the number of cells in an x direction and the number of cells in a y direction, which are obtained by the calculation of starting point and end point cell addresses, are stored so as to form a rectangular shape in an accessed order. To access to the cell memory, a cell number arrayed in an access order and the pixel address in each cell are used. The cell numbers from (0, 0) to (2, 3) in FIG. 7 are not a cell address calculated from the pixel address but an address imparted in the cell memory for the sake of convenience.

The cell memory is generally larger than a necessary rectangular area (area shown with a broken line in FIG. 7) from the starting point coordinates to the end point coordinates. Data can be stored in the memory cell in sequence on the cell basis and be read out with a general binary address. Such a cell memory, if the shape of a cell is specified, can be implemented by known technologies such as generation of the memory address using counters and adders at the time of storage.

The starting point address (pixel address in a cell) obtained in the aforementioned look-up tables 14 and 16 for modulo operation is used as a pixel address of the cell memory in FIG. 7. A cell (0, 0) in FIG. 7 includes the starting point coordinates to which a first read access was made from the SDRAM. This is because a pixel address in the cell (0, 0) is stored in the address (0, 0) of the cell memory. Thus, an area of a specified size (XS, YS) is read from image data (4×3 cells) stored in the cell memory. Variables XS and YS can be calculated from the starting point coordinates and the end point coordinates of an image. Readout of such a specified rectangular area can be implemented by well-known technologies such as setting the calculated XS and YS values to a register.

The block memory in the image processing apparatus is the memory for performing image processing of pixel data in a specified block transferred from the memory access device. In the present embodiment, 8×8 pixel data is stored.

In the present embodiment, a cell address Cell(x, y) and a pixel address in the cell PixC(x, y) can be obtained from a pixel address Pix(x, y). Accordingly, when block data is read from the memory, it becomes possible to easily obtain which cell to access. It is to be noted write operation will be described later as it is a different operation from the read operation.

Further, since 250 bits out of 256 bits accessed to the SDRAM are used, an SDRAM utilization ratio is 250/256=Similarly, in terms of access efficiency, the number of words necessary for 250 bits to be used is 15.625 words, and the access efficiency is 15.625 words/16 words=97.7%. Therefore, even when the number of bits per pixel is not a power of 2, the memory utilization ratio and memory access efficiency can be improved in the present embodiment as compared with the background art in which the number of horizontal pixels and the number of vertical pixels in a cell are set to powers of 2.

In the present embodiment, a table of division by 5 and a modulo 5 arithmetic table are used since a cell is made up of 5×5 pixels. However, the numeric value may be changed depending on the size of the memory. For example, when only one DDR3-SDRAM is used, the number of bits to be accessed in one burst is 128 bits, and therefore, one cell contains 128÷10=12 pixels. In this case, 12 pixels may be arranged as 3×4 pixels, and a table of division by 3, a modulo 3 arithmetic table, a table of division by 4, and a modulo 4 arithmetic table may be used. Since the number of pixels 4 in the vertical direction is a power of 2, bit assignment conversion as in the background art may be performed. More specifically, a value y/4 may be obtained by shifting the variable "y" by 2 bits, and Modulo(y, 4) may be obtained by taking out lower 2 bits of "y."

Moreover, it is not necessary to use the number of pixels in a cell to the maximum extent. In the present embodiment, an area of 5×5 pixels may be replaced with an area of 5×4 pixels (efficiency being 78%) and an area of 6×4 pixels (efficiency being 94%). More specifically, by setting the cell shape according to the circumstances and conditions of the image processing apparatus, how to assign 256 bits, as a unit of cell access, to image data can optimally be set together with other conditions with respect to application purposes.

Figure 8:
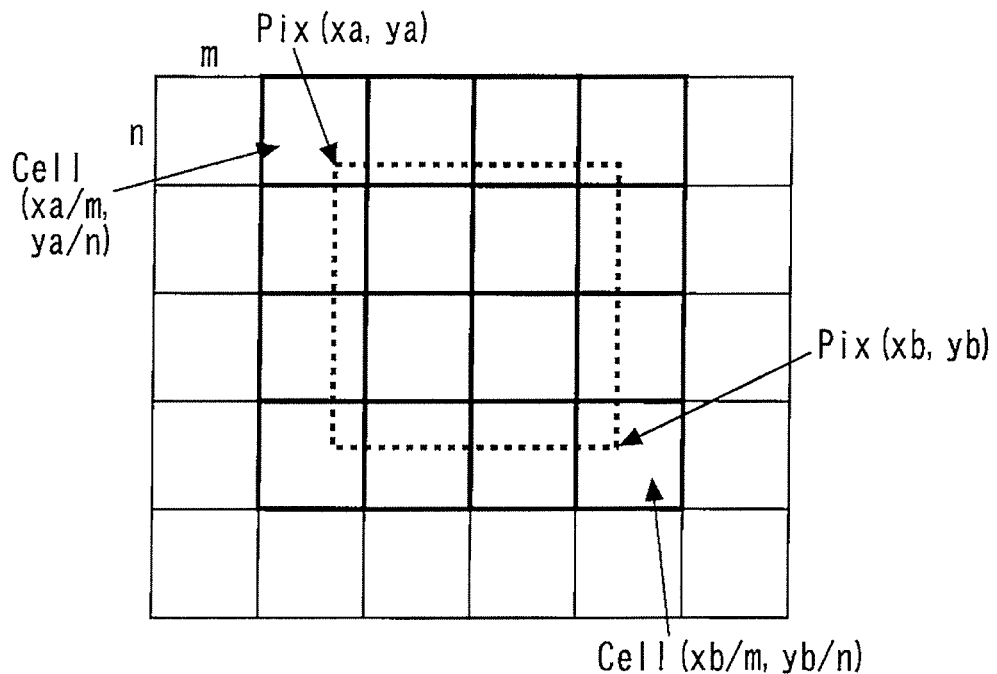
FIGS. 8 and 9 are views for explaining access methods for use in block-based image processing.
Figure 9:
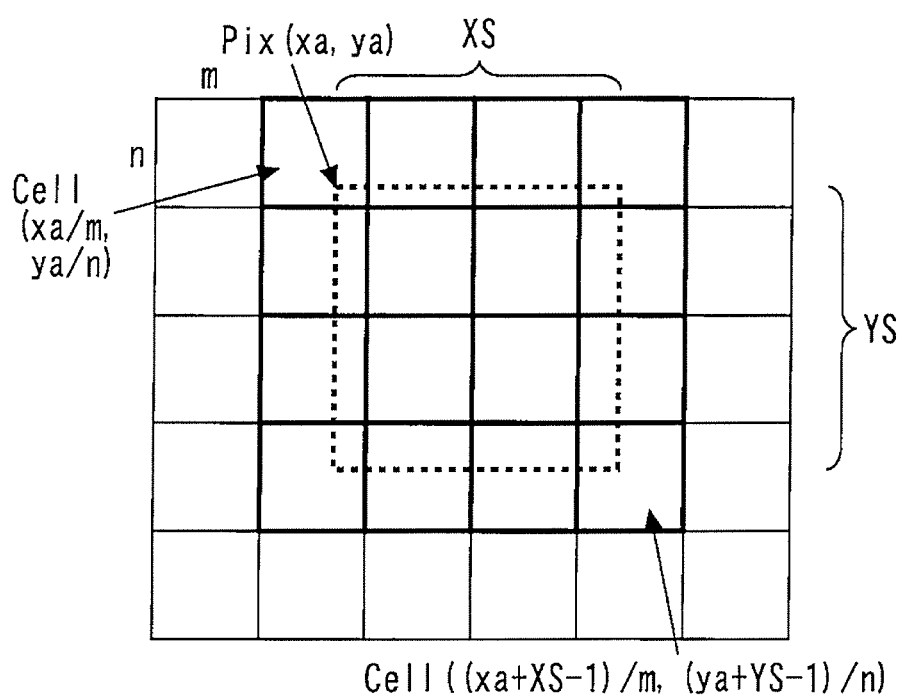

According to the present embodiment, at the time of performing block-based image processing, a range of the cells to be accessed can also be obtained. FIGS. 8 and 9 are views for explaining access methods for use in block-based image processing. In these drawings, a solid line designates a cell, while a broken line designates a block.

Used in a method of FIG. 8 are a block starting point (upper left pixel address Pix(xa, ya)), a block end point (lower right pixel address Pix(xb, yb)), and the number of horizontal pixels m and the number of vertical pixels n in a cell. The starting point cell address is Cell(xa/m, ya/n) and the end point cell address is Cell(xb/m, yb/n). The SDRAM address of the cells corresponding to this range (cells expressed with a thick boxes in the drawing) is burst-accessed.

Used in a method of FIG. 9 are a block starting point Pix(xa, ya), the number of horizontal pixels XS and the number of vertical pixels YS in the block, and the number of horizontal pixels m and the number of vertical pixels n in a cell. The starting point cell address is Cell(xa/m, ya/n), the end point cell address is Cell(xa+XS−1)/m, (ya+YS−1)/n). The SDRAM address of the cells corresponding to this range (cells expressed with thick boxes in the drawing) is burst-accessed.

Figure 10:
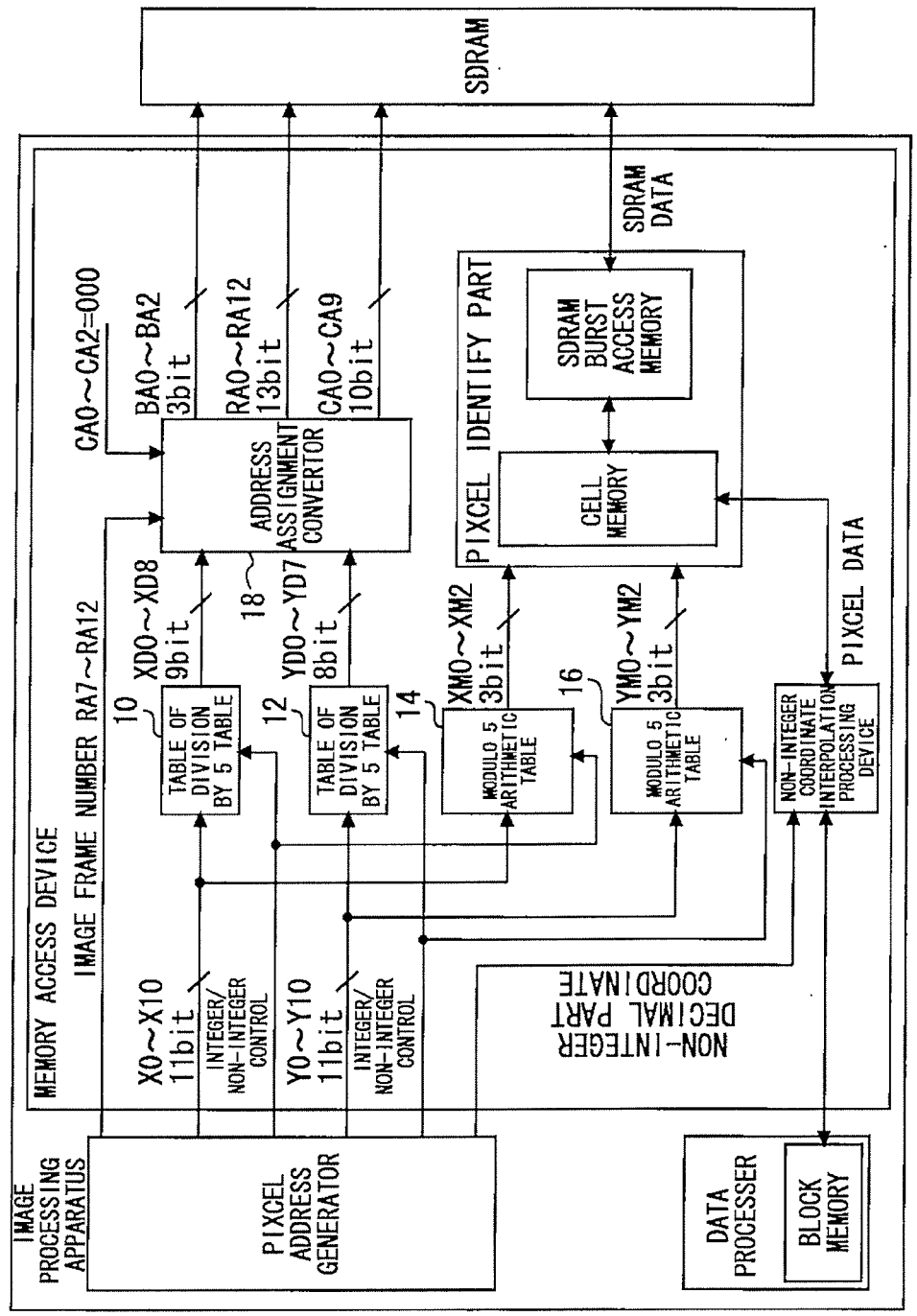
FIG. 10 is a view showing a modified example of the memory access device according to the embodiment of the present invention.

FIG. 10 is a view showing a modified example of the memory access device according to the embodiment of the present invention. This device includes a switchover control between integer coordinates and non-integer coordinates. When accuracy of horizontal or vertical pixels is non-integer pixel accuracy, a rectangular area expressed with the starting point coordinates and the end point coordinates of the block is subjected to interpolation processing using a specified number of pixels in a non-integer pixel accuracy direction. For example, in the case of half-pixel accuracy and quarter-pixel accuracy for use in MPEG image coding or the like, truncated starting point coordinates (xa, ya) and end point coordinates (xb, yb) of a block are obtained by discarding respective fraction parts of accurate starting point coordinates (xas, yas) and end point coordinates (xbs, ybs) of a block including the fractional parts, and the obtained area of starting point and end point coordinates are subjected to interpolation processing that uses 3 pixels in both directions, in which the area wider than the block coordinates is accessed. Therefore, the SDRAM address of the cells corresponding to the range of the starting point coordinates (xa−2, ya−2) and the end point coordinates (xb+3, yb+3) may be burst-accessed.

Figure 11:
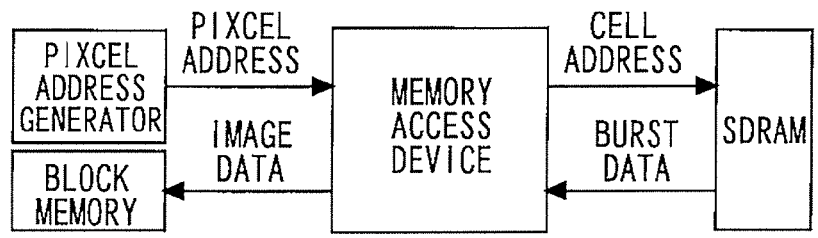
FIG. 11 is a view showing an image processing apparatus of integer pixel accuracy.
Figure 12:
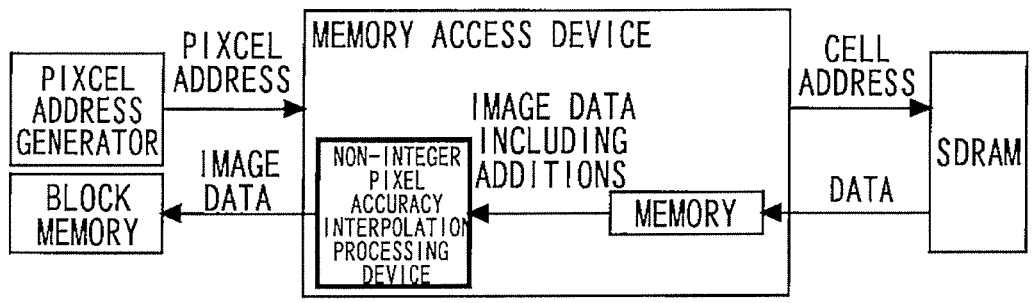
FIG. 12 is a view showing the image processing apparatus including an interpolation processor of non-integer pixel accuracy.

FIG. 11 is a view showing an image processing apparatus of integer pixel accuracy. FIG. 12 is a view showing the image processing apparatus including an interpolation processor of non-integer pixel accuracy. In the case of integer pixel accuracy, image data is directly transferred from the memory access device to the block memory of the image processing apparatus. As compared with this, in the case of non-integer pixel accuracy, image data is interpolated in the interpolation processor, and is then transferred to the block memory of the image processing apparatus.

Figure 13:
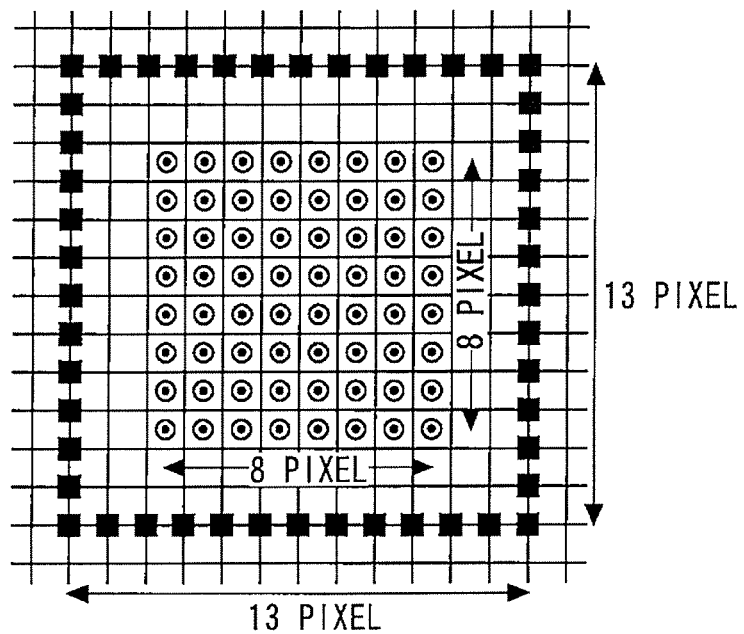
FIG. 13 is a view for explaining image access with non-integer pixel accuracy.

FIG. 13 is a view for explaining image access with non-integer pixel accuracy. For example, in the case of accessing an 8×8 block image, a 13×13 rectangular area, including 3 left and right-side pixels each in the horizontal direction and 3 upper and lower pixels each in the vertical direction, is accessed. Next, the rectangular area is interpolated to generate an 8×8 block image accessed with non-integer pixel accuracy. Next, the block image is subjected to block image processing.

Figure 14:
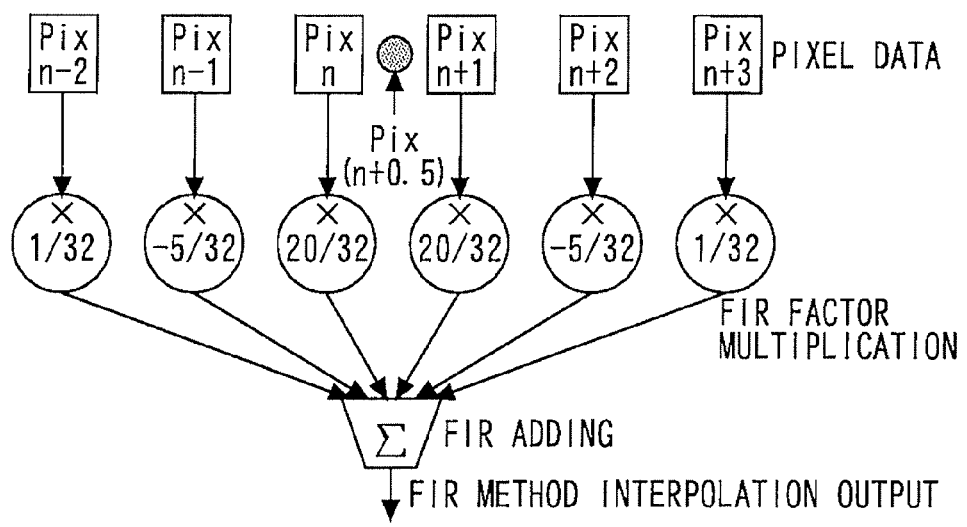
FIGS. 14 and 15 are views showing the interpolation processor.
Figure 15:
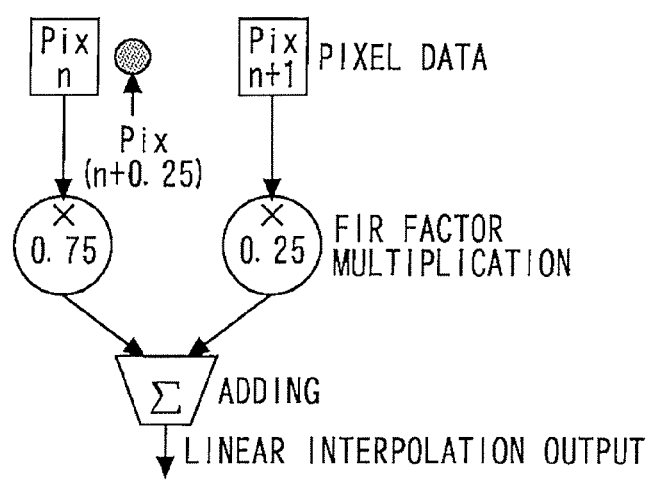

FIGS. 14 and 15 are views showing the interpolation processor. Interpolation processing is generally performed based on the principle of FIR (Finite Impulse Response) filters. Interpolation processing is also specified in MPEG image coding international standard. In the MPEG-2 video coding standard, non-integer pixel accuracy is specified as half-pixel accuracy, and linear interpolation processing using neighboring one pixel on the right and left sides and upper and lower sides (simple FIR filter called bilinear interpolation) is specified as interpolation processing. In the MPEG-4 AVC (H.264) coding standard, processing in combination of 6-TAP (referred to as 6th-order filter in FIR processing) FIR filters using 3 pixels each on the right and left sides and upper and lower sides and 2-TAP linear interpolation processing is specified for luminance pixels. The device in FIG. 14 performs interpolation processing at a half pixel position with 6-TAP FIR filters both in the horizontal direction and in the vertical direction. The device in FIG. 15 performs interpolation processing at a quarter pixel position with 2-TAP linear interpolation.

It is to be noted that in FIGS. 11, 12, 14, and 15, the processing only in a one-dimensional horizontal direction or vertical direction is described in order to avoid complicated explanation. In actuality, two-dimensional processing is necessary. When the address value in both the horizontal direction and the vertical direction is a non-integer pixel address value, interpolation processing is performed both in the horizontal direction and the both direction.

Figure 16:
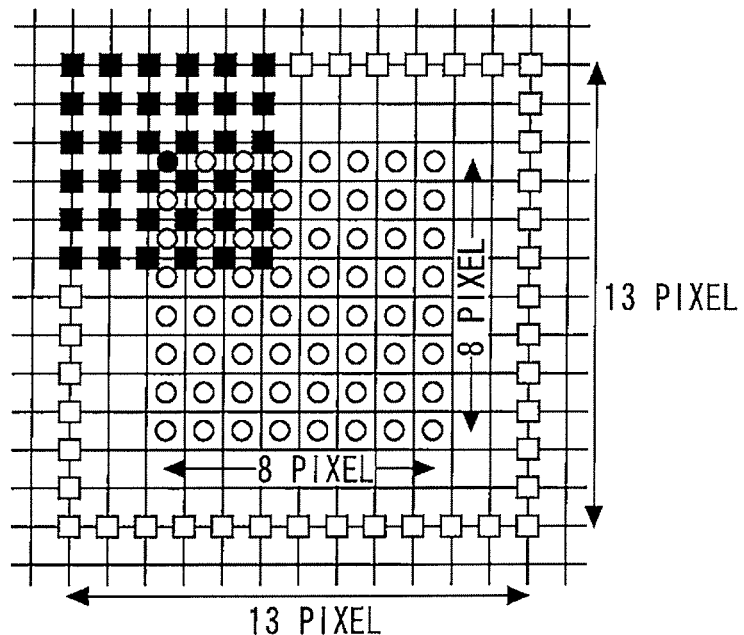
FIG. 16 is a view for explaining interpolation processing with the device in FIG. 14.

In the device in FIG. 14, 6-TAP FIR processing is performed to calculate a pixel Pix(n+0.5) at a fractional 0.5 pixel position. The pixels necessary for this processing is Pix(n−2) to Pix(n+3). FIG. 16 is a view for explaining interpolation processing with the device in FIG. 14. In the case of calculating an upper left pixel (black circle in FIG. 16) in 8×8 pixels, total 36 pixels (black squares in FIG. 16) from 13×13 pixels.

In the device in FIG. 15, a pixel Pix(n+0.25) at a fractional 0.25-pixel position is calculated. Pixels necessary for this calculation are Pix(n) and Pix(n+1).

With respect to a two-dimensional rectangular area from a starting point Pix(xa, ya) to an end point Pix(xb, yb), pixels necessary for 6-TAP FIR interpolation processing will be explained. The necessity of additional 3 pixels in each direction is determined by whether pixel coordinates xa, ya, xb, and yb are integer or non-integer, and thereby an area of pixel data to access is determined. For example, when a target image block is an 8×8 block made up of integer coordinates and if the coordinate xa is an integer, xb is also an integer, whereas if the coordinate xa is a non-integer, xb is also a non-integer having the same fractional part as that of xa. Similarly if the coordinate ya is an integer, yb is also an integer, whereas if the coordinate ya is a non-integer, yb is also a non-integer having the same fractional part as that of ya. It is to be noted that the coordinates xa, xb, ya, and yb take a value of zero or positive value and do not take negative values.

If the coordinates of image data to access is integer pixel coordinates, access to additional pixels is not necessary so that an access amount can be reduced. In order to access to the required minimum image data to enhance efficiency, access to additional 3 pixels is spared in the case of integer pixel coordinates. For example, when pixel values of non-integer coordinates require 6-TAP FIR interpolation processing in the case of image access from a starting point Pix(xa, ya) to an end point Pix(xb, yb), and an area necessary when both the x-coordinate and the y-coordinate are non-integer is an area from a starting point Pix(xa−2, ya−2) to an end point Pix(xb+3, yb+3). When xa is a non-integer and ya is an integer, 3 pixels in both the right and left-side are additionally accessed with respect to the x-coordinate, and therefore, 13 pixels are accessed. However, with respect to the y-coordinate, additional 3 pixels in the upper nor lower-side are not accessed, and therefore, 8 pixels are accessed. That is, in the case where non-integer position pixels are present only in the x-coordinate, the starting point coordinates of the area to access are set as (xa−2, ya) and the end point coordinates are set as (xb+3, yb), so that the number of cells to be accessed can be minimized. Similarly, in the case where non-integer position pixels are present only in the y-coordinate, the starting point coordinates of the area to access are set as (xa, ya−2) and the end point coordinates are set as (xb, yb+3), so that the number of cells to be accessed can be minimized.

For modification of the starting point coordinates and end point coordinates and for modulo operation in the case of non-integer pixel coordinates, a switchover control between integer coordinates and non-integer coordinates may be provided in the respective look-up tables for x and y directions. The device in FIG. 10 includes such switchover control. The memory access device obtains, in the look-up table for division, a cell address corresponding to the starting point coordinates and a cell address corresponding to the end point coordinates, and accesses to the respective cells from the starting point cell to the end point cell in sequence.

Figure 17:
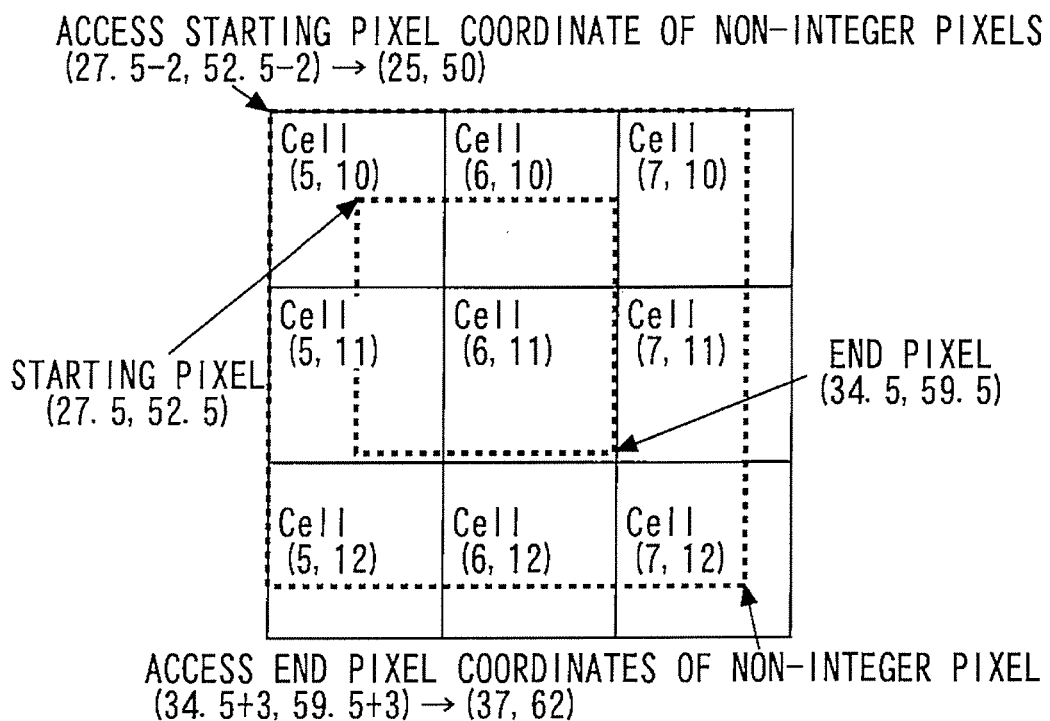
FIG. 17 is a view showing the case where variables "x" and "y" are non-integer coordinates.

FIG. 17 is a view showing the case where variables "x" and "y" are non-integer coordinates. The cell size is 5×5 pixels, the block size is 8×8 pixels, the starting point coordinates are (27.5, 52.5) and the end point coordinates are (34.5, 59.5). In this case, the cell address at the starting point to be accessed is ((27.5−2)/5, (52.5−2)/5)=(25.5/5, 50.5/5)=(5, 10). The cell address at the end point to be accessed is ((34.5+3)/5, (59.5+3)/5)=(37.5/5, 62.5/5)=(7, 12). That is, since the starting point cell address is (5, 10) and the end point cell address is (7, 12), total nine cells: (5, 10), (6, 10), (7, 10), (5, 11), (6, 11), (7, 11), (5, 12), (6, 12), and (7, 12) are accessed. In this case, the access may be carried out in the order of (5, 10), (6, 10), (7, 10), (5, 11), (6, 11), (7, 11), (5, 12), (6, 12), and (7, 12), or in the order of (5, 10), (5, 11), (5, 12), (6, 10), (6, 11), (6, 12), (7, 10), (7, 11), and (7, 12).

Moreover, in response to the cell address modified based on non-integer coordinates corresponding to these value, the look-up tables 14 and 16 for modulo operation are used to perform modulo operation of the cells that include a modified starting point pixel and a modified end point pixel. In this example, a value (0, 0) is outputted as a result of the modulo operation performed on an integer part (25, 50) of the modified starting point coordinates, and a value (2, 2) is outputted as a result of the modulo operation performed on an integer part of the modified end point coordinates (37, 62).

With respect to both the x-coordinate and the y-coordinate, control signals are inputted into the interpolation device, the control signals being 00 in the case where the fraction part of non-integer coordinates is 0, being 01 in the case of 0.25, being 10 in the case of 0.5, and 11 in the case of 0.75. The interpolation device performs pixel access from the cells corresponding to these values and interpolation processing.

Figure 18:
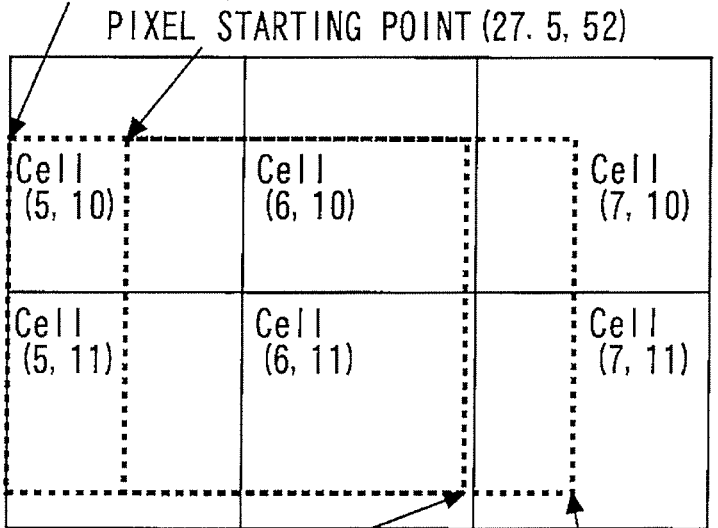
FIG. 18 is a view showing the case where a variable "x" is a non-integer coordinate and a variable "y" is an integer coordinate.

FIG. 18 is a view showing the case where a variable "x" is a non-integer coordinate and a variable "y" is an integer coordinate. The cell size is 5×5 pixels, the starting point coordinates are (27.5, 52) and the end point coordinates are (34.5, 59). In this case, the cell address at the starting point to be accessed is ((27.5−2)/5, 52/5)=(25.5/5, 52/5)=(5, 10). The cell address at the end point to be accessed is ((34.5+3)/5, 59/5)=(37.5/5, 59/5)=(7, 11). In short, total six cells from (5, 10) to (7, 11) are accessed. At this case, in response to inputs of a starting point coordinate integer part (27, 52) and an end point coordinate integer part (34, 59), the look-up tables 10 and 12 for division by 5 are used to output, with non-integer control signals, a division result (5, 10) for the starting point (25, 50) and a division result (7, 11) for the end point (37, 59). Since the starting point cell address is (5, 10) and the end point cell address is (7, 11), total six cells, (5, 10), (6, 10), (7, 10), (5, 11), (6, 11) and (7, 11) are accessed. In the case where "x" is an integer coordinate and "y" is a non-integer coordinate, the number of cells to be accessed is decreased from 9 cells, which is in the case where "x" and "y" are non-integer coordinates, to 6 cells.

Figure 19:
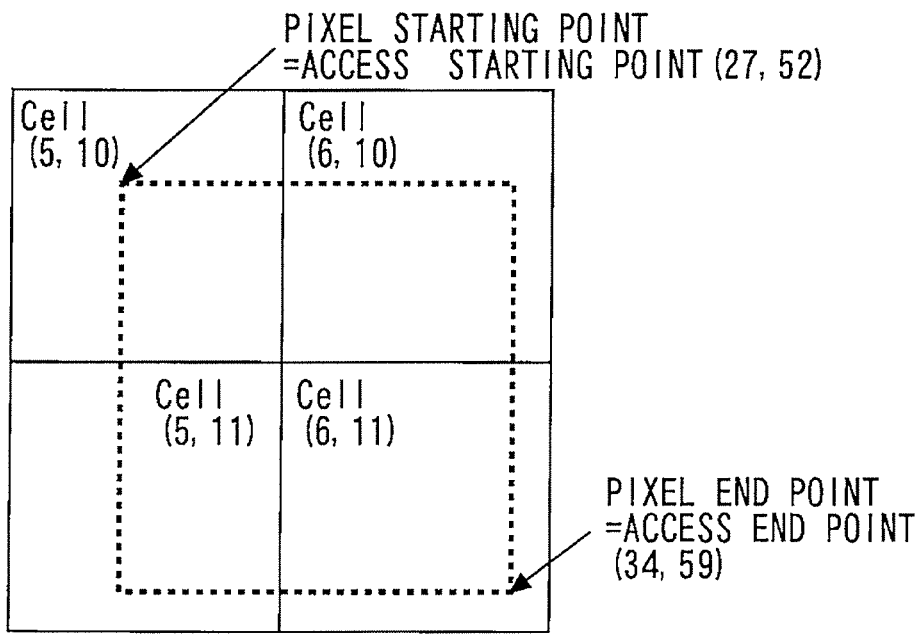
FIG. 19 is a view showing the case where "x" and "y" are integer coordinates.

When "x" and "y" are integer coordinates, the number of cells to be accessed is further decreased. FIG. 19 is a view showing the case where "x" and "y" are integer coordinates. The starting point is (27, 52) and the end point is (34, 59). In this case, the starting point cell address is (5, 10) and the end point cell address is (6, 11), so that only 4 cells (5, 10), (5, 11), (6, 10), and (6, 11) need to be accessed.

Interpolation processing, which is performed using additional 3 pixels on each direction in the present embodiment, is the interpolation processing specified to the case where a luminance component based on the international standard H.264 is a non-integer position pixel. When a non-integer coordinate pixel value is specified with 2-TAP FIR interpolation processing and the image access is from a starting point Pix(xa, ya) to an end point Pix(xb, yb), an area necessary when both the x-coordinate and the y-coordinate are non-integer is an area from a starting point Pix(xa, ya) to an end point Pix(xb+1, yb+1).

When a chrominance component is a non-integer pixel coordinate, an interpolation processing may be performed with additional one pixel. Similarly, also in the case of MPEG-2, interpolation processing may be performed with additional one pixel. In this case, a rectangular area expressed with starting point coordinates (xa, ya) and end point coordinates (xb, yb) of a block is subjected to interpolation processing using additional one pixel in each direction, and the area including the additions for non-integer coordinates is accessed. Therefore, the SDRAM address of the cells corresponding to the range of the starting point coordinates (xa, ya) to the end point coordinates (xb+1, yb+1) may be burst-accessed.

In the case where interpolation processing is performed with one additional pixel in each direction on the assumption that the cell size is 5×5 pixels, the block size is 8×8 pixels, the pixel starting point coordinates are (27.5, 52.5) and the end point coordinates are (34.5, 59.5), the cell address at the starting point to be accessed is (27.5/5, 52.5/5)=(25/5, 50/5)=(5, 10). The cell address at the end point to be accessed is ((34.5+1)/5, (59.5+1)/5)=(35.5/5, 60.5/5)=(7, 12). That is, total nine cells having the cell address of (5, 10) to (7, 12), 9 cells in total are accessed.

Moreover, in response to the cell address modified based on non-integer coordinates corresponding to these value, the look-up tables 14 and 16 for modulo operation is used to perform modulo operation of the cells that include a modified starting point pixel and a modified end point pixel. In this example, a value (2, 2) is outputted as a result of the modulo operation performed on an integer part (27, 52) of the modified starting point coordinates, and a value (0, 0) is outputted as a result of the modulo operation performed on an integer part of the modified end point coordinates (35, 60).

In the case where non-integer pixels are xa only, the starting point coordinates of the area to access are set as (xa, ya) and the end point coordinates are set as (xb+1, yb), so that the number of cells to access can be minimized. Moreover, in the case where non-integer pixels are ya only, the starting point coordinates of the area to access are set as (xa, ya) and the end point coordinates are set as (xb, yb+1), so that the number of cells to access can be minimized. For modification of the starting point coordinates and end point coordinates and for modulo operation in the case of non-integer pixel coordinates, a switchover control between integer coordinates and non-integer coordinates may be provided in the respective look-up tables for x and y directions. Thus, interpolation processing using additional pixels may be applied for the target pixels.

Figure 20:
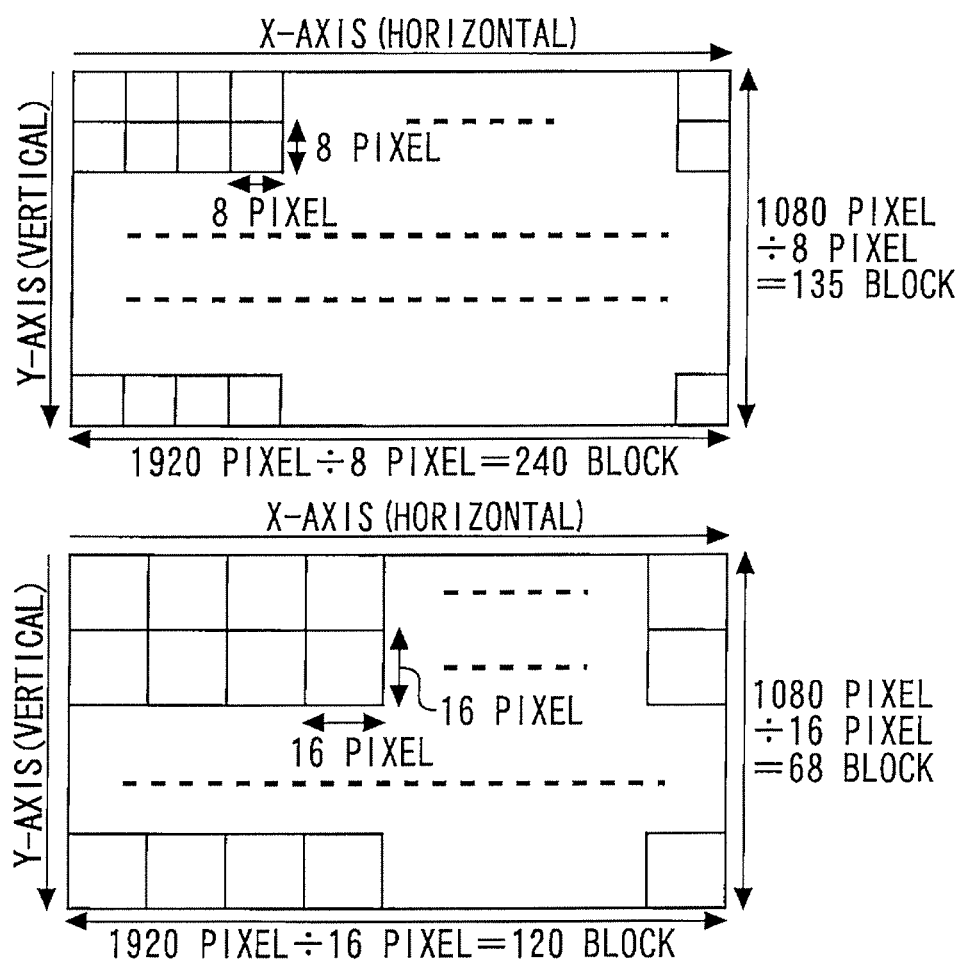
FIG. 20 is a view showing an HD image.

In the foregoing, a description has been given of operation of read operation for the SDRAM (transfer of image data in the SDRAM to image processing apparatus) in the image processing. Contrary to this, write operation for the SDRAM (transfer of image data in the image processing apparatus to the SDRAM) after image processing is different from the read operation. In the above-mentioned MPEG image coding or other general image processing, an image memory has upper left end pixel coordinates (0, 0) and has lower right end pixel coordinate as maximum pixel coordinates. For example, in an HD (High Definition) image, a frame means one image, and the size thereof is 1920×1080. FIG. 20 is a view showing an HD image. The image is treated as the image made up of 240×135 blocks, one block being made up of 8×8 blocks. Alternatively, for the sake of convenience, the image may have a size of 1920×1088 formed from 120×68 blocks where one block is made up of 16×16 blocks, and an area of 1920×1080 is cropped for image display. It should naturally be understood that pixel coordinates are expressed with integer values.

Figure 21:
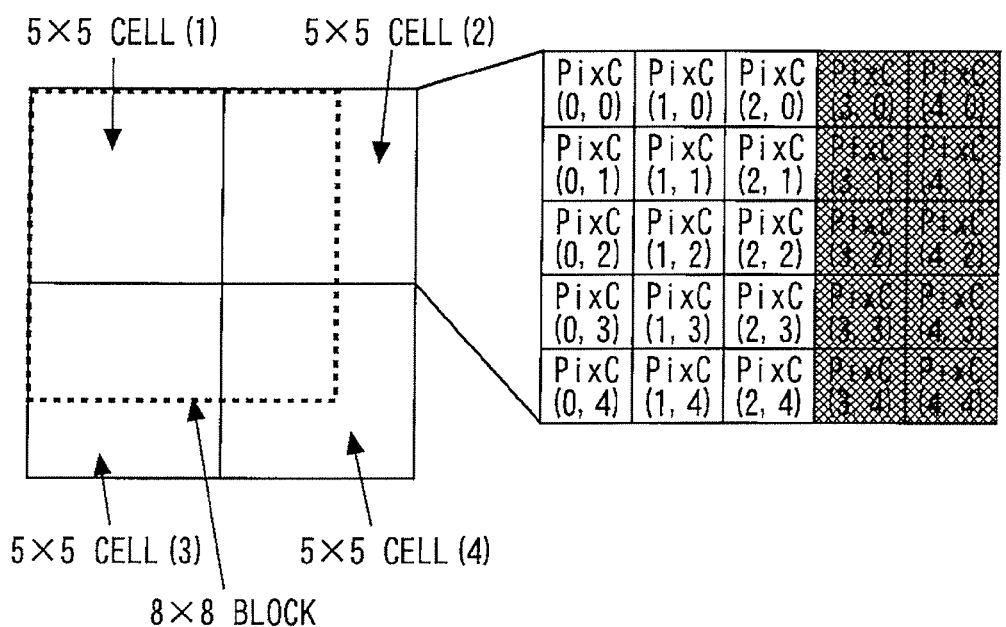
FIG. 21 is a view for explaining the case where write operation for the SDRAM is performed as a reverse action of the read operation.

FIG. 21 is a view for explaining the case where write operation for the SDRAM is performed as a reverse action of the read operation. Generally, image processing is performed from the upper left block toward the lower right block. Therefore, when the write operation is performed as a reverse action of the read operation at the time of writing a processed image block to the SDRAM, the pixels not belonging to a processing target block (pixels outside the block) are also written as shown in FIG. 21. When pixels in a 5×5 cells (2) in FIG. 21 are written to the SDRAM, shaded pixels in the cell do not belong to an 8×8 blocks that is an image processing target. The operation to rewrite the pixels which do not belong to the target block causes the pixels, if they are processed image data, to be changed into image data different from the expected result of the processing. If the pixels are pre-processing image data, they are rewritten into unintended image data.

To solve such inconvenience in the write operation, there are two solutions as shown below:
(1) An internal memory larger in size than the block memory for SDRAM access is provided. At the time of access before processing, pixel data that is not a processing target, among the image data read-accessed from the SDRAM, is stored in the memory, and only the pixel data that is a processing target is rewritten in the write operation, so that the same size data is written by the reverse action of the read access operation.
(2) Since the block is aligned in such a way that pixels are arrayed from the upper left end in the SDRAM as mentioned above, a rectangular area where an integer number of cells and an integer number of blocks are matched, and this rectangular area is butch-written to the SDRAM. For example, since the cell size is 5×5 and the block size is 8×8 in the above-mentioned example, the area of 40×40 satisfies the matching integer numbers with 8×8 cells and with 5×5 blocks.

The method (1) involves write operation in an area larger in size than the block, which deteriorates write access efficiency. In contrast, the method (2) requires an internal memory as large as 40×40, though the write operation efficiency is high.

When write operation is made to an area from a cell that includes the starting point coordinates of an arbitrary block, which is written to the SDRAM, to a cell including the end point coordinates, the block to be written, if the block is single in number, is an 8×8 rectangular area. However, a target area of the write operation is a rectangular area made up of a plurality of 5×5 cell rectangular areas. Consequently, the area generally larger than the area which should be written is written. This means that data of the area, which should not be written, is unintentionally written.

At the same time, write operation for the unintended area deteriorates the write operation efficiency. In order to avoid this problem, a condition that the blocks to be written are aligned is set. For example, the blocks that should be written are set to be aligned in order from the upper left end. In the case of the cell size being 5×5 pixels and the block size being 8×8, a 40×40 pixel area obtained with 40, or the least common multiple of 5 and 8 is butch-written. As a consequence, 5×5 blocks match 8×8 cells, so that unintentional write of pixel data can be avoided.

Figure 22:
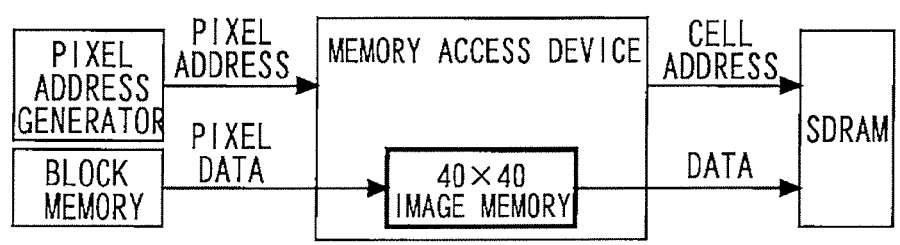
FIG. 22 is a view showing a device by the method (2).
Figures 23, 24:
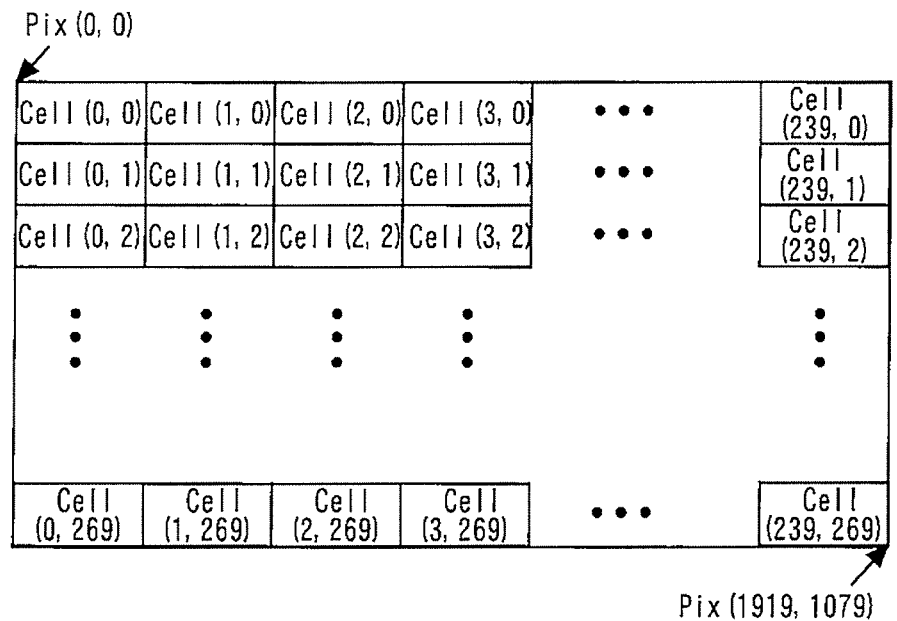
FIG. 23 is a view showing the pixel address and the cell address in an HD image in the background art in the case of 8 bits/pixel.
FIG. 24 is a view showing the pixel address in each cell in the background art in the case of 8 bits/pixel.

FIG. 22 is a view showing a device by the method (2). In the above-described read operation, the pixel address from the image processing apparatus was the starting point coordinates Pix(xa, ya) and the end point coordinates Pix(xb, yb). In this method, the starting point coordinates are integer values of the multiple of 8 on the constant basis. The end point coordinates are values with 39 added to the starting point coordinates on the constant basis. For example, if the starting point coordinates are Pix(40, 80), the end point coordinates are Pix(79, 119). A 40×40 image memory in FIG. 22 can be implemented by using the cell memory in FIG. 4. In short, write operation can be performed by setting the size of the cell memory to a 40×40 image (8×8-cell) and changing a data transfer direction from a read operation direction.

Although the memory that is burst-accessed by the memory access device is an SDRAM in the present embodiment, the memory may be any memory without being limited to the SDRAM.

The invention claimed is:
1. A memory access device, comprising:
calculating a number of pixels in one burst access by dividing a number of bits obtained in one burst access of a memory storing an image frame by a number of bits per pixel and discarding a fraction of a remainder after dividing the number of bits obtained in one burst access of the memory storing the image frame by the number of bits per pixel;
arranging a rectangular area having number of pixels equal to or less than the calculated number of pixels in the image frame as a cell in response to discarding the fraction;
accessing the memory by using the cell, and reads a block of a part of the image frame;
a first look-up table outputting a result of dividing a horizontal component of a pixel address in the block by number of pixels in a horizontal component of the cell;
a second look-up table outputting a result of dividing a vertical component of a pixel address in the block by number of pixels in a vertical component of the cell;
a third look-up table outputting a residue as a result of dividing a horizontal component of a pixel address in the block by number of pixels in a horizontal component of the cell; and
a fourth look-up table outputting a residue as a result of dividing a vertical component of a pixel address in the block by number of pixels in a vertical component of the cell,
wherein the output value of the first look-up table and the output value of the second look-up table are addresses of the cell for burst access to the memory,
the cell is read from the memory by the burst access using the addresses of the cell, the output value of the third look-up table and the output value of the fourth look-up table are used as pixel addresses in the cell, and a pixel in the read cell is specified by using the pixel address.

2. The memory access device according to claim 1, wherein when accuracy of horizontal or vertical pixel coordinates is non-integer pixel accuracy, a rectangular area expressed with starting point coordinates and end point coordinates of the block is subjected to satisfy interpolation processing corresponding to a specified number of pixels for interpolation and its memory accesses.

3. The memory access device according to claim 1 or 2, wherein in a write operation which stores an image-processed block of pixels to the memory by burst access, a rectangular area where an integer number of cells and an integer number of blocks of the image-processed image frame are matched, and the rectangular area is batch-written to the memory.

* * * * *